United States Patent
Roth et al.

(10) Patent No.: US 7,530,064 B2
(45) Date of Patent: May 5, 2009

(54) METHOD AND APPARATUS FOR AUTOMATED REGISTRY CLEAN-UP

(75) Inventors: Steven T. Roth, Sunnyvale, CA (US); Harshavardhan R. Kuntur, Sunnyvale, CA (US); Aswin Chandramouleeswaran, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 560 days.

(21) Appl. No.: 10/945,613

(22) Filed: Sep. 21, 2004

(65) Prior Publication Data

US 2006/0095925 A1 May 4, 2006

(51) Int. Cl.
G06F 9/44 (2006.01)

(52) U.S. Cl. ............... 717/170; 717/168; 717/174; 719/322; 719/324; 719/327

(58) Field of Classification Search ......... 717/168–178, 717/121; 719/319–327
See application file for complete search history.

(56) References Cited

U.S. PATENT DOCUMENTS

| | | | | |
|---|---|---|---|---|
| 5,732,268 | A * | 3/1998 | Bizzarri ............... | 713/2 |
| 5,974,454 | A * | 10/1999 | Apfel et al. ............ | 709/221 |
| 6,154,878 | A | 11/2000 | Saboff | |
| 6,247,175 | B1 * | 6/2001 | Ledford et al. ......... | 717/157 |
| 6,266,811 | B1 * | 7/2001 | Nabahi ................. | 717/174 |
| 6,301,710 | B1 * | 10/2001 | Fujiwara ............... | 717/175 |
| 6,347,397 | B1 | 2/2002 | Curtis | |
| 6,374,401 | B1 | 4/2002 | Curtis | |
| 6,446,255 | B1 * | 9/2002 | Curtis et al. ........... | 717/121 |
| 6,550,061 | B1 | 4/2003 | Bearden et al. | |
| 2003/0074551 | A1 * | 4/2003 | Chandramouleeswaran et al. ................ | 713/100 |
| 2004/0083473 | A1 * | 4/2004 | Thomas et al. ......... | 717/174 |
| 2004/0128670 | A1 * | 7/2004 | Robinson et al. ....... | 718/1 |
| 2005/0050084 | A1 * | 3/2005 | Atm ..................... | 707/102 |
| 2005/0155031 | A1 * | 7/2005 | Wang et al. ............ | 717/170 |

OTHER PUBLICATIONS

Du et al., "Security Relevancy Analysis on the Registry of Windows NT 4.0", 1999, IEEE, pp. 331-338.*
Di et al., "Learning Resource Registry and Discovery System", 2004, IEEE, pp. 1-6.*
Ganapathi et al., "Why PCs Are Fragile and What We Can Do About It: A Study of Windows Registry Problems", 2004, IEEE, pp. 1-6.*
Environment variable, Fetched from http://en.wikipedia.org/wiki/Environment_variable, on Aug. 15, 2008, pp. 1-8.*
An Email Worm Vaccine Architecture, Publisher Springer Berlin / Heidelberg, vol. 3439/2005, 2005, pp. 97-108.*
The evoloution of malicious agents, Lenny Zeltser, IEEE, Apr. 2000, pp. 1-20.*

* cited by examiner

*Primary Examiner*—Wei Y Zhen
*Assistant Examiner*—Satish Rampuria

(57) ABSTRACT

One embodiment disclosed relates to a method of automated registry clean-up for an operating system of a computer system. Interfaces on which each module depends is determined, and a module is marked as obsolete if the module depends on an interface that is non-existent in the operating system. Configuration data is removed from a system registry for modules marked as obsolete. Other embodiments are also disclosed.

21 Claims, 5 Drawing Sheets

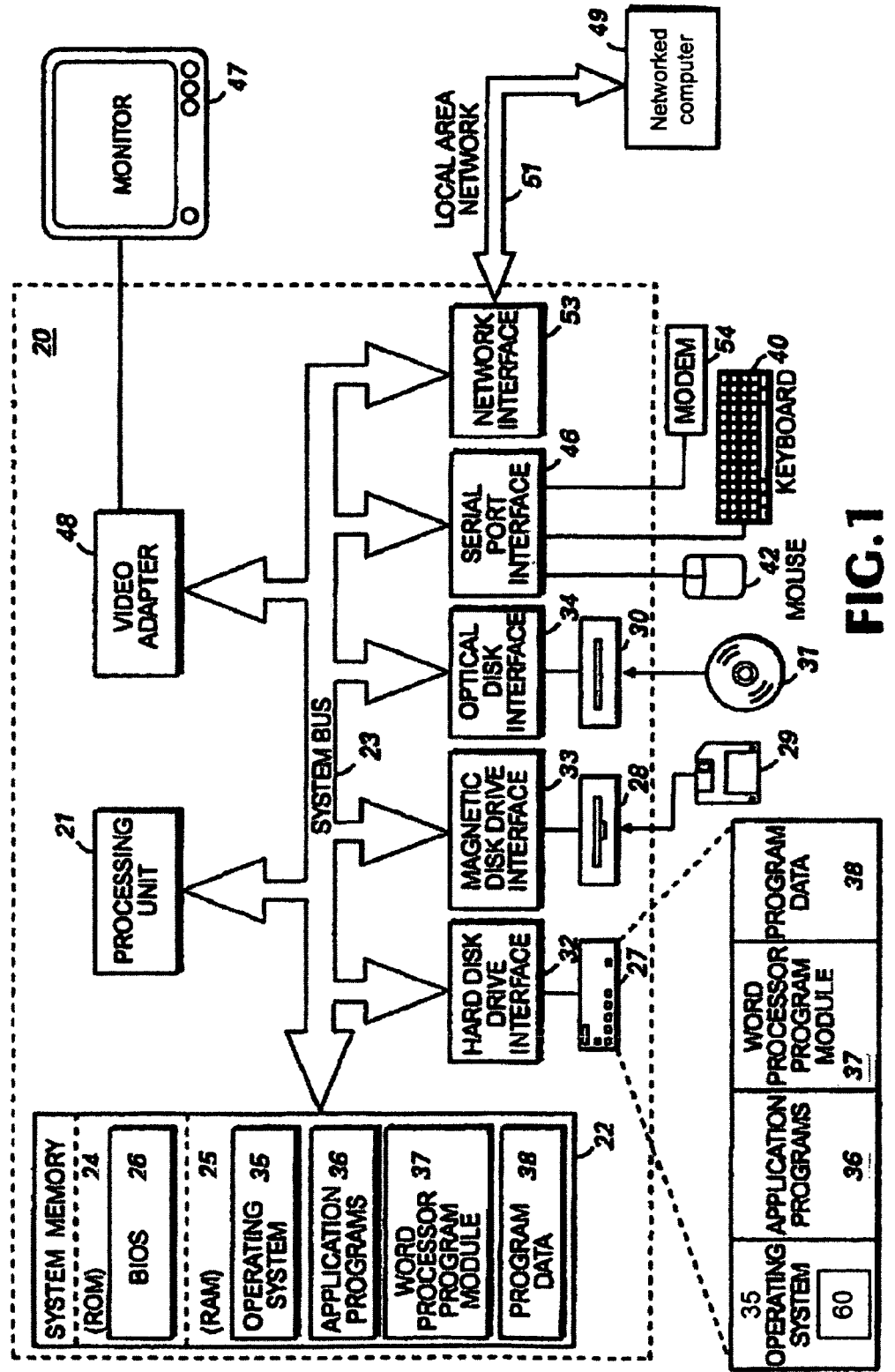
FIG. 1
(Conventional)

METHOD AND APPARATUS FOR AUTOMATED REGISTRY CLEAN-UP

FIELD OF THE INVENTION

The present disclosure relates generally to computer systems and software. More particularly, the present disclosure relates to computer operating systems.

DESCRIPTION OF THE BACKGROUND ART

Computer systems are widely used and include personal computers, workstations, servers, and other systems.

An operating system (OS) is an important component of a computer system and comprises software that controls the allocation and usage of hardware resources, such as memory, processor time, data storage space, and peripheral devices, such as a monitor, input devices, and printers. Commonly-used operating systems include various forms of UNIX, including HP-UX (from the Hewlett-Packard Company of Palo Alto, Calif.), Solaris (from Sun Microsystems of Santa Clara, Calif.), IBM AIX (from International Business Machines Corp of Armonk, N.Y.), Linux and others, and various versions of Windows (from the Microsoft Corporation of Redmond, Wash.).

Operating systems are often updated. An update may be in the form of an updated version of the operating system. An update may also be due to the installation or un-installation of a software or hardware component to the computer system.

It is desirable to improve computer systems and software. In particular, it is desirable to improve operating systems.

SUMMARY

One embodiment of the invention pertains to a method of automated registry clean-up for an operating system of a computer system. Interfaces on which each module depends is determined, and a module is marked as obsolete if the module depends on an interface that is non-existent in the operating system. Configuration data is removed from a system registry for modules marked as obsolete or no longer present on the system.

Another embodiment pertains to an apparatus for automated clean-up of a system registry of a computer system. Computer-executable code is configured to determine interfaces on which each module depends, mark a module as obsolete if the module depends on an interface that is non-existent in the computer system, and remove data from the system registry for modules marked as obsolete or no longer present on the system.

Other embodiments are also disclosed.

BRIEF DESCRIPTION OF THE DRAWINGS

FIG. 1 is a schematic diagram of a conventional computer system in which an embodiment of the invention may be implemented.

DETAILED DESCRIPTION

Figure 2:
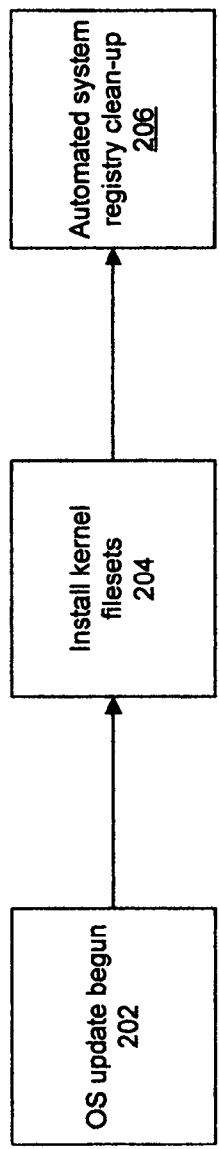
FIG. 2 is a high-level flow chart depicting an operating system updating process that includes automated system registry clean-up in accordance with an embodiment of the invention.

As discussed above, operating systems are often updated. When an update occurs, it is desirable to maintain certain configuration information. In other words, it is desirable for certain configuration information to be persistent across operating system updates.

Such configuration information may be kept in a system registry of an operating system. For example, a system registry may be utilized to maintain kernel configuration data for a UNIX type operating system. As another example, some versions of Windows use a system registry to maintain configuration data relating to hardware, software, and users of the computer system.

It is desirable for a system registry to be maintained so as to keep parts pertaining to the current system configuration and to remove parts that are no longer necessary. However, in practice, many obsolete parts are often kept in a system registry.

For example, a software application may be installed and then later removed. The removal should ideally take place by way of an uninstall application or script that removed all parts from the system registry that are associated with the removed application and are no longer needed. Unfortunately, applications are often removed without an uninstall application or script being run. Moreover, the uninstall application or script is sometimes not properly configured to remove all the no longer needed parts from the system registry, such that obsolete parts are often left behind.

An embodiment of the present invention relates to a mechanism to maintain a system registry so as to retain parts required for the current system configuration and to remove parts that are no longer needed.

Example Computing Environment

FIG. 1 and the following discussion are intended to provide a brief, general description of a suitable computing environment in which the invention may be implemented. While the invention will be described in the general context of an operating system in conjunction with a personal computer or workstation, those skilled in the art will appreciate that the invention may be practiced with other computer system configurations, for example, including multiprocessor systems.

With reference to FIG. 1, an exemplary system for implementing the invention includes a conventional computer system 20, including a processing unit 21, a system memory 22, and a system bus 23 that couples the system memory to the processing unit 21. The system memory 22 may include both read only memory (ROM) 24 and random access memory (RAM) 25. A basic input/output system 26 (BIOS), containing the basic routines that help to transfer information between elements within the personal computer 20, such as during start-up, may be stored in ROM 24. The computer system 20 may further include a hard disk drive 27, a magnetic disk drive 28, e.g., to read from or write to a removable disk 29, and an optical disk drive 30, e.g., for reading a CD-ROM or DVD disk 31 or to read from or write to other optical media. The hard disk drive 27, magnetic disk drive 28, and optical disk drive 30 may be connected to the system bus 23 by a hard disk drive interface 32, a magnetic disk drive interface 33, and an optical drive interface 34, respectively. The drives and their associated computer-readable media may provide nonvolatile storage for the personal computer 20.

A number of program modules may be stored in the drives and RAM 25, including an operating system 35, one or more application programs 36, such as a word processor program module 37, program data 38, and other program modules. As discussed above, the present disclosure relates to the operating system 35, and particularly, to a system registry 60 utilized as part of the operating system 35.

A user may enter commands and information into the computer system 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, computer systems often include other peripheral output devices (not shown), such as speakers or printers.

The computer system 20 may operate in a networked environment using logical connections to one or more networked computers 49. The networked computer 49 may be a server, a router, a peer device or other common network node, and typically includes many or all of the elements described relative to the computer system 20. The network connections may include a network interface 53 connecting to a local area network (LAN) 51 and a modem 54 that may connect to a wide area network (WAN). Such networking environments are commonplace in offices, enterprise-wide computer networks, intranets and the Internet. In a networked environment, program modules depicted relative to the computer system 20, or portions thereof, may be stored in a networked memory storage device.

Automated Registry Clean-up

FIG. 2 is a high-level flow chart depicting an operating system updating process that includes automated system registry clean-up in accordance with an embodiment of the invention. Here, an operating system update involves updating a version of the operating system. For example, going from an older version of HP-UX to a newer version. The operating system update begins (202) and the updated kernel filesets are installed (204). Thereafter, in accordance with an embodiment of the invention, a process for automated system registry clean-up may be advantageously performed.

Figure 3:
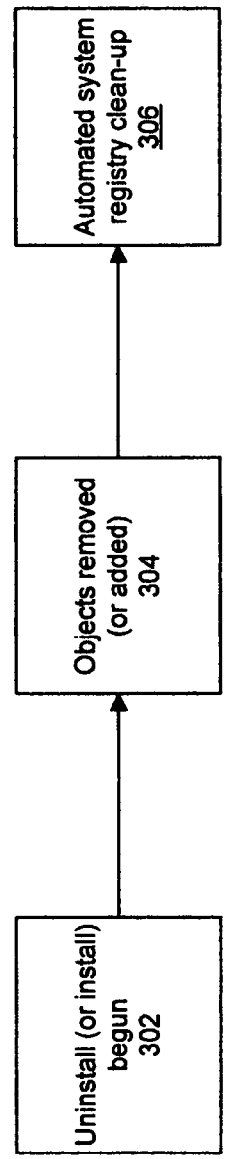
FIG. 3 is a high-level flow chart depicting a component installation or uninstallation process that includes automated system registry clean-up in accordance with an embodiment of the invention.

FIG. 3 is a high-level flow chart depicting a component installation or uninstallation process that includes automated system registry clean-up in accordance with an embodiment of the invention. Here, the component uninstalled (or installed) may be a hardware component or a software program. For example, a new video card may be installed, or an old video card uninstalled. As another example, a new application program may be installed, or an old application program may be uninstalled. The uninstallation (or installation) is begun (302), and objects specific to the component are removed (or added) (304). Thereafter, in accordance with an embodiment of the invention, a process for automated system registry clean-up may be advantageously performed (306). One embodiment runs such a clean-up procedure after every component installation or uninstallation. Another embodiment runs such a clean-up procedure after every component uninstallation (but not every installation).

Figure 4:
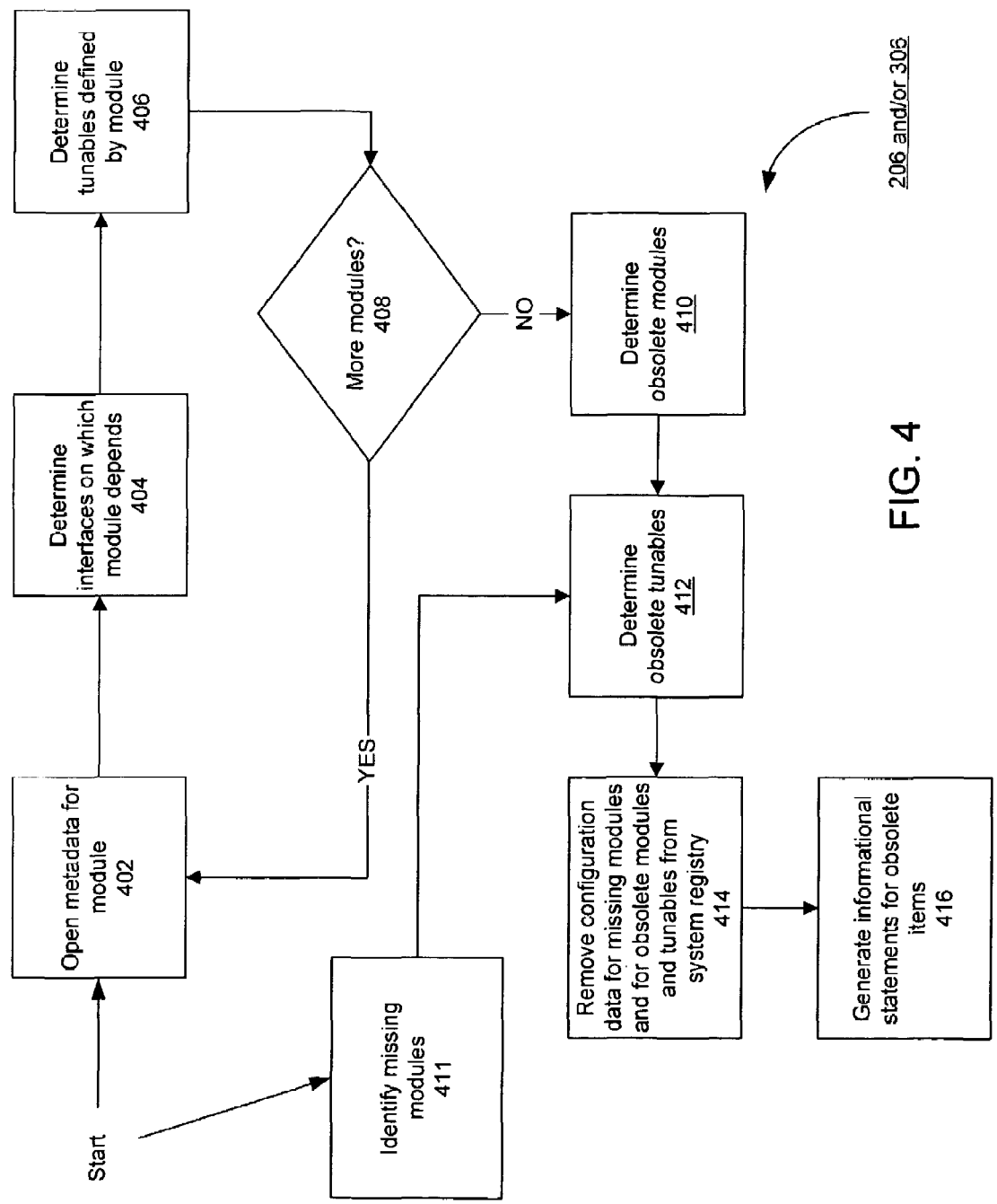
FIG. 4 is a flow chart depicting a process for automated system registry clean-up in accordance with an embodiment of the invention.

FIG. 4 is a flow chart depicting a process (206 and/or 306) for automated system registry clean-up in accordance with an embodiment of the invention. A loop (402, 404, 406, 408) is performed over all the modules installed on the system.

For each module, the metadata for the module is opened (402). In accordance with an embodiment of the invention, the metadata is configured to indicate interfaces on which the module depends and also configured to indicate tunables (system variables) supported by the module. Dependency statements within the metadata may be used to indicate interfaces on which the module depends. Definition statements within the metadata may provide information as to the tunables defined by the module.

By examining the metadata for each module, a determination (404) may be made as to the interfaces on which the module depends. For example, the metadata for module A may have a dependency statement indicating that module A depends on LAN API 1.1 (local area networking application programming interface version 1.1). Based on that statement, it is determinable that module A depends on version 1.1 of the application programming interface for local area networking. As another example, the metadata for module B may have a dependency statement indicating that module B depends on LAN API 2.0 (local area networking application programming interface version 2.0). Based on that statement, it is determinable that module B depends on version 2.0 of the application programming interface for local area networking.

By examining the metadata for each module, a determination (406) may also be made as to the tunables defined in the module. For example, the metadata for module D may have a definition statement indicating that module D defines a tunable (system variable) for the number of processors.

When the metadata for each module has been examined (408), then a determination (410) may be made as to which modules are obsolete. In accordance with one embodiment of the invention, this determination (410) of obsolete modules may be performed using a procedure discussed further below in relation to FIG. 5. In addition, missing or absent modules may also be identified (411). In other words, modules no longer present on the system may be determined.

In addition, a determination (412) may be made as to which tunables are obsolete. In accordance with one embodiment of the invention, this determination (412) of obsolete tunables may be performed using a procedure discussed further below in relation to FIG. 6.

In accordance with one implementation, after the identification of missing modules and the determination of the obsolete modules and tunables, the configuration data for the missing modules and for the obsolete modules and tunables may be removed (414) from the system registry. In an alternate implementation, the configuration data for the obsolete modules may be removed once the obsolete modules have been determined (and prior to the determination of the obsolete tunables, if any).

In accordance with one embodiment, a "warning" message or informational statement may be generated (416) for each obsolete module and/or obsolete tunable. Such a message or statement may be presented to a user and/or kept in a log file.

Figure 5:
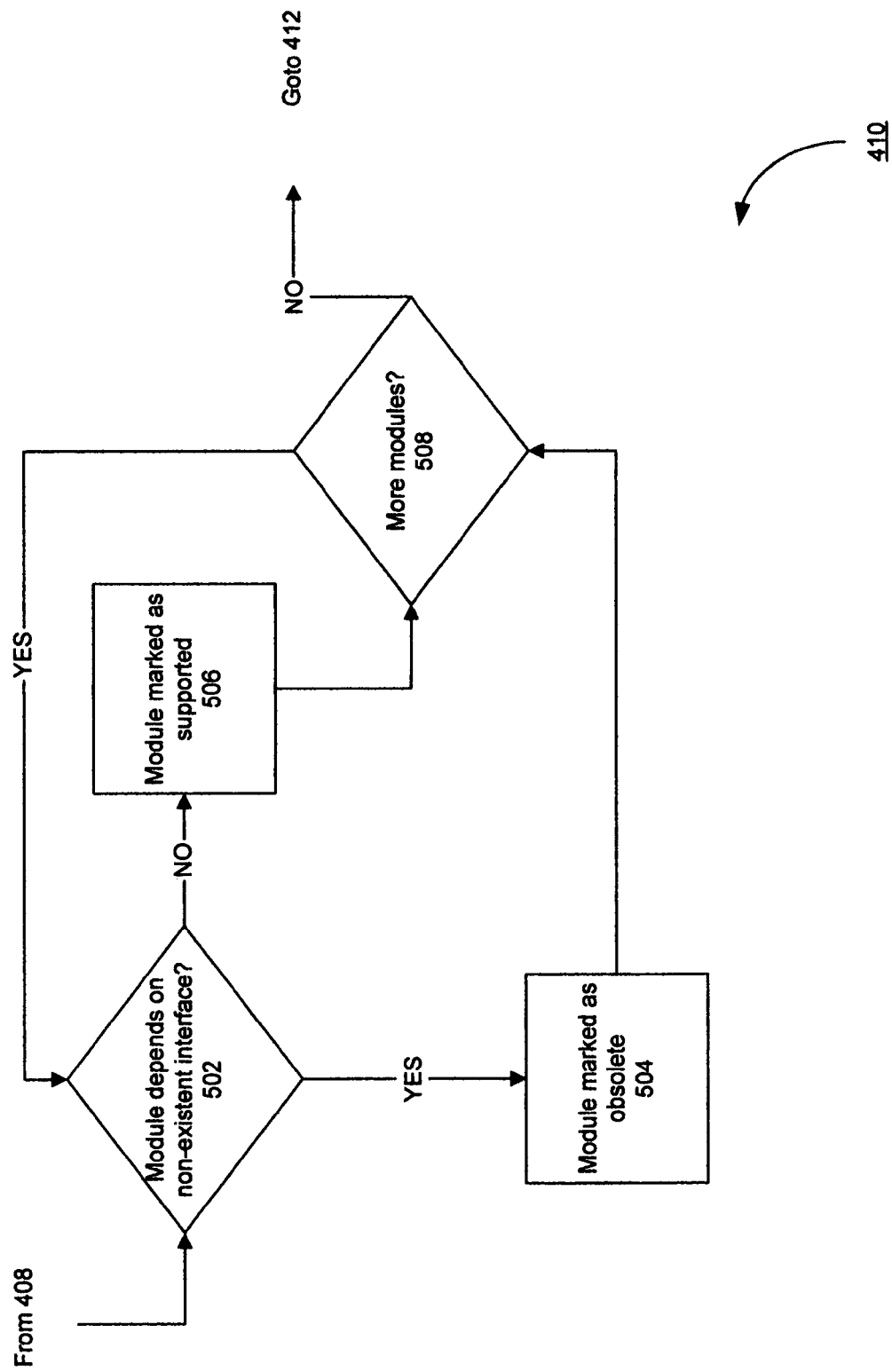
FIG. 5 is a flow chart depicting a procedure for determining obsolete modules in accordance with an embodiment of the invention.

FIG. 5 is a flow chart depicting a procedure (410) for determining obsolete modules in accordance with an embodiment of the invention. For each module, this procedure determines (502) if the module depends on a non-existent interface. If the module does depend on a non-existent interface, then the module is marked as obsolete (504). Otherwise, the module is marked as supported (506). The procedure may be performed until all modules have been processed (508).

For example, module A may depend on LAN API 1.1, and LAN API 1.1 may no longer exist on the system. In that case, module A would be marked as obsolete (504). On the other hand, module B may depend on LAN API 2.0, and LAN API 2.0 may exist on the system. In that case, module B would be marked as supported (506).

Figure 6:
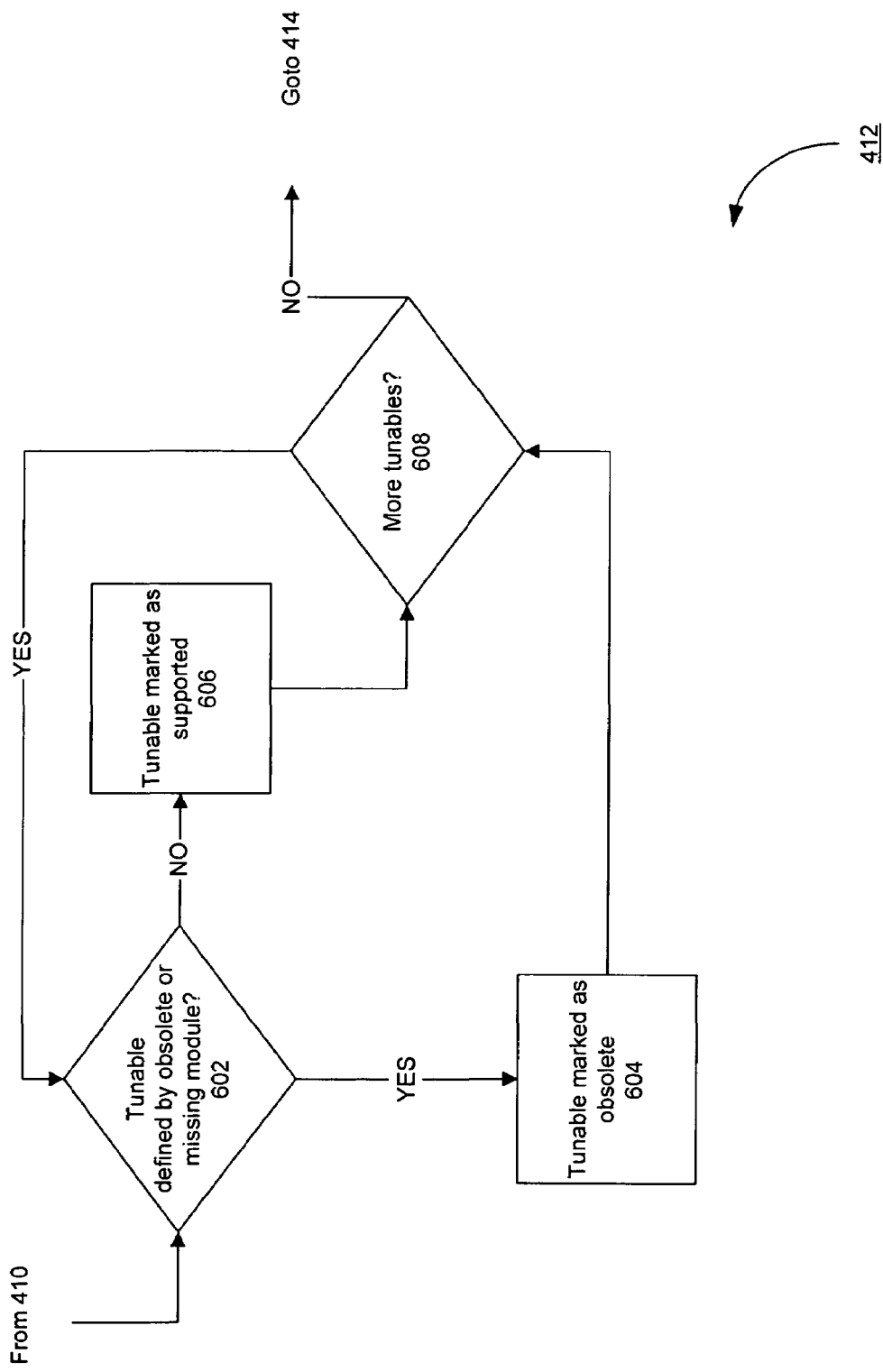
FIG. 6 is a flow chart depicting a procedure for determining obsolete tunables in accordance with an embodiment of the invention.

FIG. 6 is a flow chart depicting a procedure for determining obsolete tunables in accordance with an embodiment of the invention. For each module, this procedure determines (602) if the tunable is defined by an obsolete or missing module. If the tunable is defined by an obsolete module or by a module no longer present in the system, then the tunable is marked as obsolete (604). Otherwise, the tunable is marked as supported (606). The procedure may be performed until all tunables have been processed (608).

For example, a tunable for the number of processors may be defined by module D, which is supported. In that case, the tunable for the number of processors would be marked as supported (606). On the other hand, another tunable for the varying a debug level of the system may not be defined by any module that is still supported. In that case, the tunable for the system debug level would be marked as obsolete (604).

Although a specific sequence is described in the above flow charts, it should be noted that alternate sequences with same or similar effect may be utilized in alternate embodiments. For example, the determination of an obsolete module and the removal of related configuration data from the system registry may be performed within the loop (402, 404, 406, 408) in FIG. 4, rather than in the separate procedures (410 and 414).

In one embodiment, the processes discussed above in relation to FIGS. 2 through 5 may be performed by part of the operating system 35 illustrated in FIG. 1. The processes may also be performed, at least in part, by utility or application software in the computer system 20.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of automated registry clean-up for an operating system of a computer system, the method comprising:
determining interfaces on which each module depends;
marking a module as obsolete if the module depends on an interface that is non-existent in the operating system;
removing configuration data from a system registry for modules marked as obsolete and for missing modules;
determining tunables defined by a module;
marking a tunable as obsolete if the tunable is defined by an obsolete or missing module; and
removing configuration data from the system registry relating to tunables marked as obsolete,
wherein said tunables are system variables.

2. The method of claim 1, wherein the determination of interfaces on which each module depends is performed by examining dependency statements in metadata for each module.

3. The method of claim 1,
wherein the method of automated registry clean-up is performed over all modules installed on the computer system.

4. The method of claim 1, wherein the determination of tunables defined by a module is performed by examining definition statements in metadata for each module.

5. The method of claim 1, wherein the method is performed so as to clean-up the system registry in a UNIX type operating system.

6. The method of claim 1, wherein the method is performed so as to clean-up the system registry in a version of a Windows operating system.

7. The method of claim 1, wherein the method is performed after kernel filesets are installed as part of an update of the operating system.

8. The method of claim 1 wherein the method is performed after an object is uninstalled on the computer system.

9. The method of claim 8, wherein the method is also performed after an object is installed on the computer system.

10. The method of claim 1, further comprising generating an informational statement for each module determined as obsolete.

11. The method of claim 1, further comprising generating an informational statement for each tunable determined as obsolete.

12. A computer-readable medium encoded with a computer program for automated clean-up of a system registry of a computer system, the computer-readable medium comprising:
computer-executable code configured to determine interfaces on which each module depends;
computer-executable code configured to mark a module as obsolete if the module depends on an interface that is non-existent in the computer system;
computer-executable code configured to remove data from the system registry for modules marked as obsolete and for missing modules;
computer-executable code configured to determine tunables defined by a module;
computer-executable code configured to mark a tunable as obsolete if the tunable is defined by an obsolete or missing module; and
computer-executable code configured to remove configuration data from the system registry relating to tunables marked as obsolete,
wherein said tunables are system variables.

13. The computer-readable medium of claim 12, wherein the determination of interfaces on which each module depends is performed by examining dependency statements in metadata for each module.

14. The computer-readable medium of claim 12, wherein the determination of tunables defined by a module is performed by examining definition statements in metadata for each module.

15. The computer-readable medium of claim 12, wherein the system registry comprises a registry for a UNIX type operating system.

16. The computer-readable medium of claim 12, wherein the system registry comprises a registry in a version of a Windows operating system.

17. The computer-readable medium of claim 12, wherein the automated clean-up is performed after kernel filesets are installed as part of an update of an operating system.

18. The computer-readable medium of claim 12, wherein the automated clean-up is performed after an object is uninstalled on the computer system.

19. The computer-readable medium of claim 12, wherein the automated clean-up is performed after an object is either installed or uninstalled on the computer system.

20. The computer-readable medium of claim 12, further comprising computer-executable code configured to generate an informational statement for each module determined as obsolete.

21. The computer-readable medium of claim 12, further comprising computer-executable code configured to generate an informational statement for each tunable determined as obsolete.

* * * * *